US008120642B2

(12) United States Patent
Jelinek et al.

(10) Patent No.: US 8,120,642 B2
(45) Date of Patent: Feb. 21, 2012

(54) OPTICAL FINGERPRINT ACQUISITION

(75) Inventors: Jan Jelinek, Plymouth, MN (US);
Lubomir Koudelka, Shoreview, MN (US); Peter Koudelka, St. Paul, MN (US); Ryan Eckman, Forest Lake, MN (US); Daniel Blitz, Gaithersburg, MD (US)

(73) Assignee: Honeywell International Inc., Morristown, NJ (US)

( * ) Notice: Subject to any disclaimer, the term of this patent is extended or adjusted under 35 U.S.C. 154(b) by 879 days.

(21) Appl. No.: 12/180,396

(22) Filed: Jul. 25, 2008

(65) Prior Publication Data
US 2010/0020157 A1    Jan. 28, 2010

(51) Int. Cl.
*H04N 7/00* (2006.01)
*G06K 9/00* (2006.01)

(52) U.S. Cl. ............ 348/36; 348/47; 348/77; 382/115; 382/124; 382/126; 382/154; 713/186

(58) Field of Classification Search .............. 348/36, 348/47, 77; 382/115, 124, 126, 154; 713/186
See application file for complete search history.

(56) References Cited

U.S. PATENT DOCUMENTS

| 5,448,649 | A  | * | 9/1995 | Chen et al. | 382/126 |
|---|---|---|---|---|---|
| 5,818,956 | A  | * | 10/1998 | Tuli | 382/126 |
| 7,065,232 | B2 | * | 6/2006 | Geng | 382/115 |
| 7,397,943 | B2 | * | 7/2008 | Merbach et al. | 382/154 |
| 7,956,890 | B2 | * | 6/2011 | Cheng et al. | 348/143 |
| 2002/0083329 | A1 | * | 6/2002 | Kiyomoto | 713/186 |
| 2006/0110015 | A1 | * | 5/2006 | Rowe | 382/124 |
| 2006/0188132 | A1 | * | 8/2006 | Shigeta | 382/115 |
| 2006/0233427 | A1 | * | 10/2006 | Hauke et al. | 382/124 |
| 2007/0236589 | A1 | * | 10/2007 | Nakashiba | 348/294 |
| 2009/0127342 | A1 | * | 5/2009 | Giebel et al. | 235/462.42 |
| 2009/0226054 | A1 | * | 9/2009 | Jelinek | 382/126 |
| 2010/0172548 | A1 | * | 7/2010 | Mil'Shtein et al. | 382/117 |
| 2010/0254579 | A1 | * | 10/2010 | Lee et al. | 382/124 |
| 2010/0321481 | A1 | * | 12/2010 | Morin et al. | 348/77 |

* cited by examiner

*Primary Examiner* — Alina N. Boutah
(74) *Attorney, Agent, or Firm* — Schwegman, Lundberg & Woessner P.A.

(57) ABSTRACT

A swept distance between a subject and a plurality of cameras provides a plurality of raw images. Focused portions of the raw images are fused to generate a synthetic image and a distance image. A projection of the synthetic image and the distance image yields a panoramic image.

20 Claims, 4 Drawing Sheets

OPTICAL FINGERPRINT ACQUISITION

BACKGROUND

Current methods and systems for fingerprint acquisition are inadequate. Existing technology requires physical contact between the subject being fingerprinted and the fingerprinting device. Physical contact with the device can pose a hygienic challenge which, for example, may require periodic cleaning of a surface or sensor to mitigate.

In addition, the quality of the acquisition depends on the experience of the person performing the fingerprinting. For example, if the subject's finger is not precisely rolled over the card or sensor pad, then image quality is poor. As such, a subject or operator can manipulate the results obtained using existing technology. Furthermore, existing technology is labor and time intensive and thus unsuitable for mass processing facilities such as at an immigration checkpoint or at an airport.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
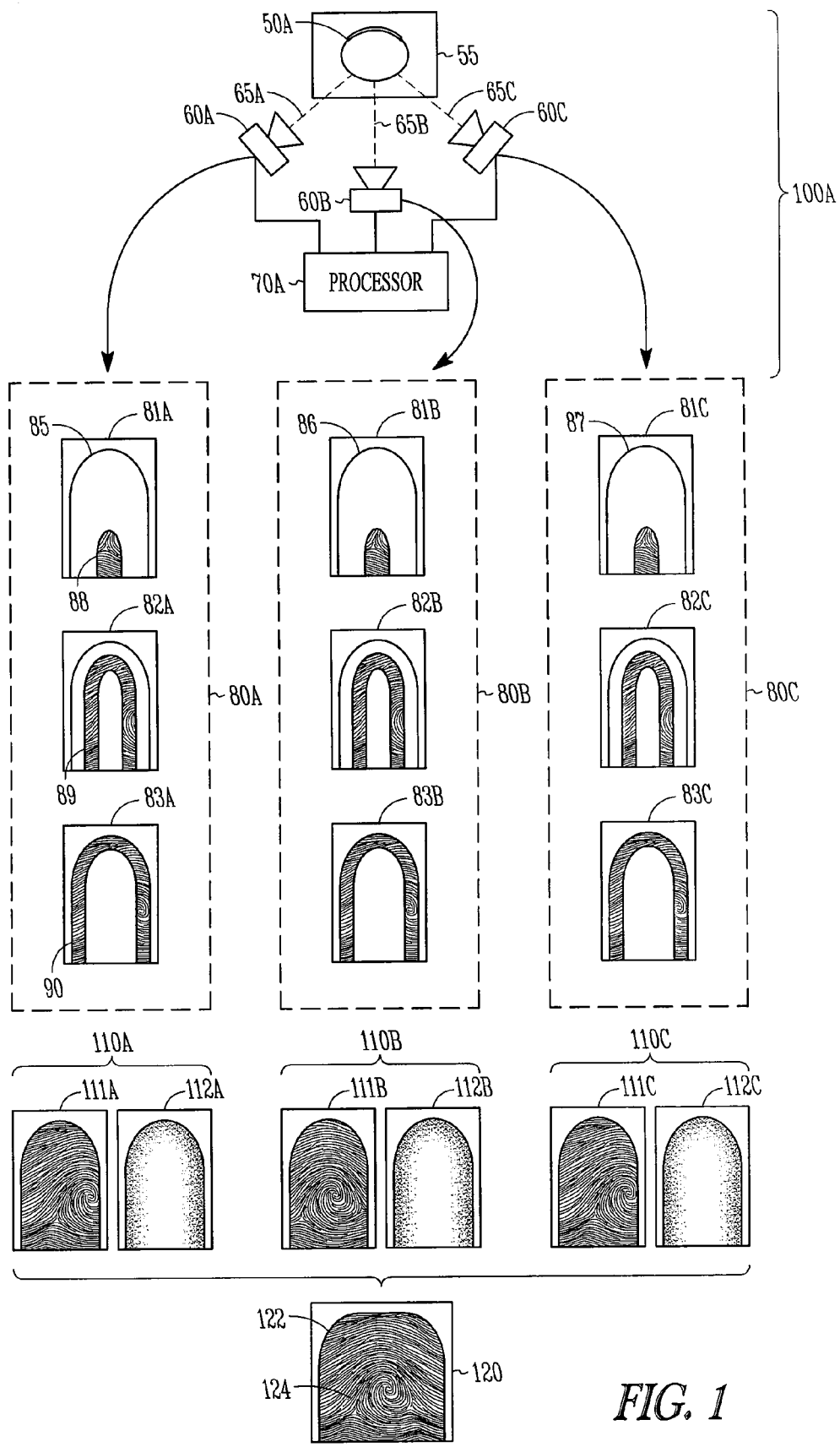
FIG. 1 includes a pictorial representation of data collection and processing according to an example embodiment.

FIG. 1 includes a pictorial representation of data collection and processing. The figure includes example system 100A for acquiring and processing data. The figure also illustrates sample results for images associated with touchless fingerprint acquisition.

According to one example, system 100A includes cameras 60A, 60B, and 60C. Cameras 60A, 60B, and 60C are directed at subject 50A within volume 55 and are coupled to processor 70A.

Volume 55 can include a chamber for receiving a finger or other subject for identification.

In particular, camera 60A is directed to subject 50A with a viewing angle aligned on radial 65A. In a similar manner, subject 50A is also viewed along radials 65B and 65C using camera 60B and camera 60C, respectively. Radials 65A, 65B, and 65C radiate from the center of volume 55 in which the subject is a target. The number of viewing angles is selected to provide a meaningful perspective as to subject 50A and, in various examples, includes more or fewer than three cameras. In addition, the selection of the viewing angles can be tailored to the particular subject of interest. In one example, the radials are selected for equal spacing between the cameras; however, in other examples, the radials are selected to provide a non-uniform distribution about the subject.

In one example, cameras 60A, 60B, and 60C have a fixed focal length and a fixed depth of focus (sometimes referred to as DOF). Depth of focus refers to the image-side depth and, in the context of a film-based photographic camera, is a measurement of how much distance exists behind the lens in which the film plane remains in focus. Depth of field, on the other hand, refers to the opposite side of the lens and is a measurement of depth of acceptable sharpness in the object (or subject) space.

In capturing an image of three-dimensional subject 50A, such as a finger, multiple images are acquired. The multiple images are taken at different distances relative to the subject. In one example, cameras 60A, 60B, and 60C have a varying distance to the subject 50A. In one example, the distances are varied by a sweeping motion of subject 50A within volume 55, while cameras 60A, 60B, and 60C remain in a fixed location.

A light source can be provided for illuminating the subject 50A. The light source can include one or more discrete lighting elements that may be located within volume 55 or a lighting element can be attached to or built-in one or more of cameras 60A, 60B, and 60C. In one example, a light source and cameras 60A, 60B, and 60C are affixed to a frame or other structure.

In the example illustrated, processor 70A is configured to receive data from cameras 60A, 60B, and 60C.

Sequences 80A, 80B, and 80C depict a series of sample images taken at various distances and acquired using cameras 60A, 60B, and 60C, respectively. Sequence 80A includes raw images 81A, 82A, and 83A; sequence 80B includes raw images 81B, 82B, and 83B; and sequence 80C includes raw images 81C, 82C, and 83C. The raw images represent subject 50A as viewed along different radials and taken at different distances. In this example, three radials are selected and three distances are depicted; however, more or fewer radials and distances are also contemplated.

For the example illustrated, the outer profile of subject 50A appears in the raw images. For instance, when viewed along radial 65A, subject 50A yields profile 85. In a similar manner, profile 86 and profile 87 are shown for views taken along radials 65B and 65C, respectively.

A raw image includes a focused portion and an unfocused portion. The location of the focused portion is determined by the distance between the particular camera 60A, 60B, or 60C and the subject 50A.

Consider next the raw images of sequence 80A. When viewed at various distances, raw image 81A depicts focused portion 88, raw image 82A depicts focused portion 89, and raw image 83A depicts focused portion 90.

As illustrated in example image 82A, the focused portion 89 (focused region or patch) for a raw image can be identified by computing contrast. A more sharply focused portion of an image will have higher contrast than other portions of the same image. A variety of algorithms can be used to derive a measure of contrast. In one example, processor 70A executes an algorithm to calculate contrast for different portions of an image using per pixel luminescence. Other measures of contrast can also be used, including those that include calculating a mean or median luminescence and comparing with a factor based on a standard deviation for the image. A measure of contrast can be based on a calculation derived from a single image or based on a calculation derived from a plurality of images in a sequence of images.

The sample images shown in FIG. 1 depict non-overlapping focused portions in successive images. In other words, the focused portions of the various images do not overlap. In one example, the focused portions of the various images overlap.

According to an example of the present system, the focused portions of the raw images are processed using a method known as fusion. Fusion refers to combining selected portions from multiple images to form a single, evenly focused image. In one example, the selected portions are the focused portions corresponding to different planes of the subject. The different planes of the subject, or slices, are a product of the narrow depth of focus and the relatively thick subject.

Various methods can be used for image fusion and they can be broadly classified as spatial domain fusion and transform domain fusion. One method for image fusion uses overlapping focused portions and includes calculating correlation values for the various images.

The various images of the finger may move across the array of camera sensors as the finger moves relative to the camera assembly. Through image fusion, the various images are combined to render a single image.

As illustrated in the figure, the raw images of sequence 80A are fused to form data 110A corresponding to radial 65A. Data 110A includes synthetic image 111A and distance image 112A. Synthetic image 111A represents a fusion of the various focused portions 88, 89, and 90. Distance image 112A represents a per pixel distance between subject 50A and camera 60A. In one example, distance image 112A includes a gray-scale representation with lighter regions corresponding to nearer distances and darker regions corresponding to farther distances.

The raw images of sequence 80B are used to generate data 110B and the raw images of sequence 80C are used to generate data 110C. Data 110B includes synthetic image 111B and distance image 112B and data 110C includes synthetic image 111C and distance image 112C.

When fusing the raw images of the finger pattern, the system also acquires information corresponding to the distance or depth profile of the finger bulb. The finger bulb refers to the pad portion of the last joint of a finger or thumb. In one example, the narrow depth of focus allows acquisition of distance information for a slice. In one example, the distance information is acquired based on the relatively steep Gaussian-like curve of contrast change with distance.

Image processing of the sequence of raw images yields a synthetic image (including the finger pattern details in sharp relief regardless of the finger size and finger placement within a particular volume) and a corresponding distance image based on the depth profile.

The synthetic images 111A, 111B, and 111C and distance images 112A, 112B, and 112C are stitched together to form panoramic image 120.

Image stitching refers to an image processing method for combining multiple images to produce a single image having a field of view that is greater than one of the combined images. Stitching can include image registration and image blending.

Panoramic image 120 includes profile 122 having image details 124 which can include, for example, an arch, a loop, a whorl, or other feature that corresponds with a rolled fingerprint image. Panoramic image 120 represents a particular projection of the synthetic images and distance images.

A projection is a method of representing a curved body (such as a finger or other subject) on a two-dimensional plane. A variety of projections can be generated based on the same set of synthetic images and distance images. For example, one projection can treat the finger as a cylinder and another can treat the finger as an ellipsoid. Other projections can also be used. For example, one projection can reflect the distortion caused by rolling a physical finger on a surface and another projection can reflect the same finger without distortion caused by the compressive forces.

The panoramic image can represent a camera view looking from the perimeter of a circle toward its center and record both the optical data and depth data.

Figure 2A:
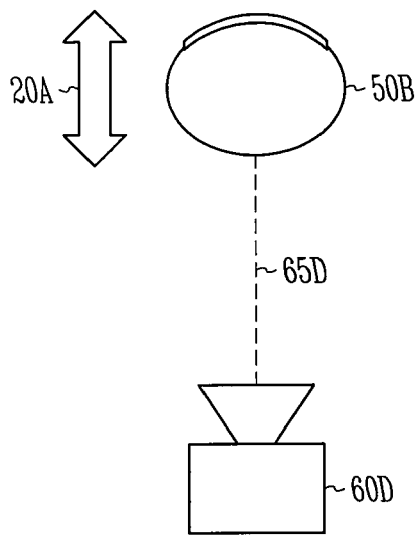
FIGS. 2A, 2B, and 2C illustrate a camera and a subject according to an example embodiment.
Figure 2B:
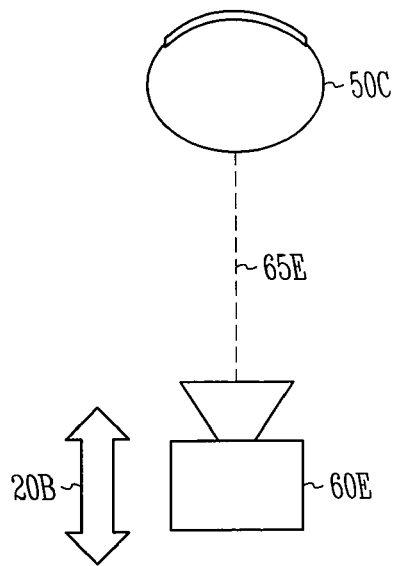
Figure 2C:
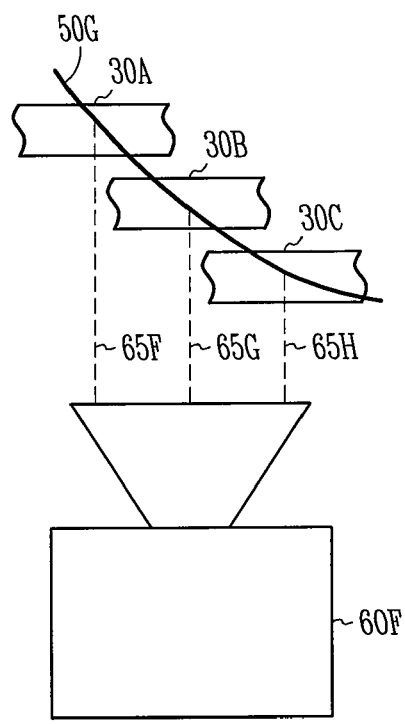

FIGS. 2A, 2B, and 2C illustrate a camera and a subject. In FIG. 2A, camera 60D is directed at subject 50B along a viewing angle described as radial 65D. In similar manner, FIG. 2B illustrates camera 60E directed at subject 50C along a viewing angle described as radial 65E. According to one example, the focused portion of a raw image (such as raw image 82A) is determined by the distance between the camera and the subject.

In FIG. 2A, the distance is varied by moving subject 50B in a manner shown by arrow 20A while the position of camera 60D remains fixed. In FIG. 2B, the distance is varied by moving camera 60E in a manner shown by arrow 20B while the position of subject 50C remains fixed.

FIG. 2C illustrates camera 60F and subject 50G. A surface of subject 50G has a three dimensional curvature. Assume, for example, that camera 60F has a fixed focal length corresponding to the distance shown on radial 65G. As such, the image lying within the depth of field for the camera lens, denoted by slice 30B, will appear focused and the details depicted in slice 30A and slice 30C will remain out of focus. The distance can be changed by moving either or both of the subject 50G and camera 60F in order to select a different slice.

In one example, the optics of camera 60F have a narrow depth of field relative to the thickness or depth of the subject (such as a finger). A synthetic image having a relatively large depth of focus can be generated by fusing portions of a number of raw images in which the raw images have a narrow depth of focus. The raw images are generated by incrementally sweeping the distance between subject 50G and camera 60F. By changing a distance between the camera and the finger, different portions of the finger are in focus in the various raw images.

One example of the present system tolerates a wide variation in the size of the finger bulb. For example, the radius of the finger bulb arc of a youth may differ in size from that of a mature bodybuilder by 5 mm or more.

In one example, the depth of focus for the camera optics spans the possible size variation and field of view (FOV) of a strip with a width of about a third of the bulb. Since the depth of focus is directly proportional to the f-number of the optical system, the larger the depth of focus, the more intense illumination or longer exposure time that is required in order to get a well-exposed image.

The present system generates a synthetic image having a large depth of focus by fusing a number of short depth of focus images. One example of the present system is immune to the relative finger-camera velocities up to approximately 100 mm/s. Cameras 60A, 60B, and 60C have a short depth of focus resulting from small f-numbers, which improves the amount of light collected during 0.1 ms exposures.

As shown in the example of FIG. 2C, the attainable depth of focus (represented by slices 30A, 30B, and 30C) per image captured by camera 60F is narrow. In one example, the depth of focus is approximately 1 to 2 mm. Since a typical finger bulb is not planar but curves away from the camera over 10 or so millimeters, a single image will not be in focus over its entire sector of the bulb. Any specific image will include a well-focused slice of the bulb pattern within the depth of focus, and other portions of the image will be out of focus and blurred.

In one example, the finger distance is varied so that the slices overlap. The portions of a raw image that are in focus are identified, extracted, and then computationally fused together into a single image in which the whole bulb is sharp and appears to be taken by a camera with a large depth of focus.

Figure 3:
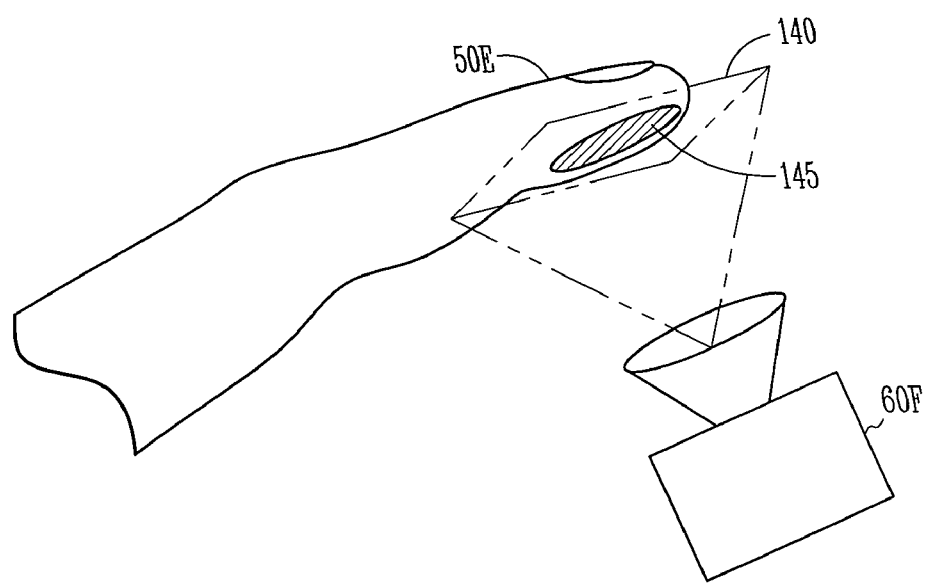
FIG. 3 includes a view of a slice taken through a finger according to an example embodiment.

FIG. 3 includes a perspective view of an optical slice taken through a human finger using camera 60F. In the figure, subject 50E is depicted as a human finger. In this example, the focal length of camera 60F is configured to select a slice 140 which includes detail 145. Other details as to a fingerprint on subject 50E can be brought into (or out of) focus by changing the distance between subject 50E and camera 60F.

In addition to determining distance based on focus as described earlier, one example uses structured beams of light arranged in a fixed pattern. The beams of light are projected in a fixed pattern onto the finger bulb to create bright dots on the finger surface. The convergent arrangement of beams causes the dot pattern to change with the finger distance, and the dot pattern distortion provides coarse information on the bulb surface 3D profile.

Figure 4:
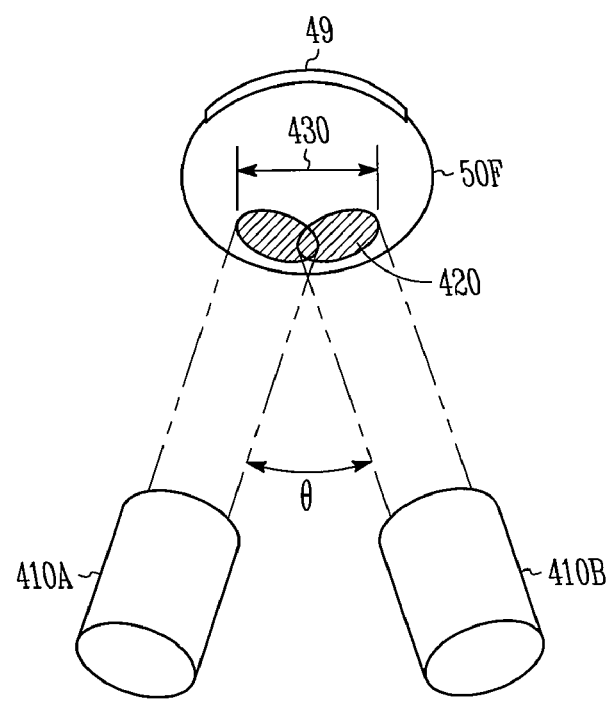
FIG. 4 includes convergent beams directed to a subject according to an example embodiment.

FIG. 4 illustrates an example in which light from convergent beams is directed to subject 50F. Light from convergent beam source 410A and source 410B is directed at subject 50F. Subject 50F represents a human finger, and for clarity, includes fingernail 49. A parameter associated with the convergent beams can be used to determine a distance. In the example illustrated, the measured parameter includes distance 430 across illuminated region 420 at the surface of subject 50F. The convergent beams are directed at included angle θ. Other methods can also be used in determining the distance between the subject 50F and the camera.

Figure 5:
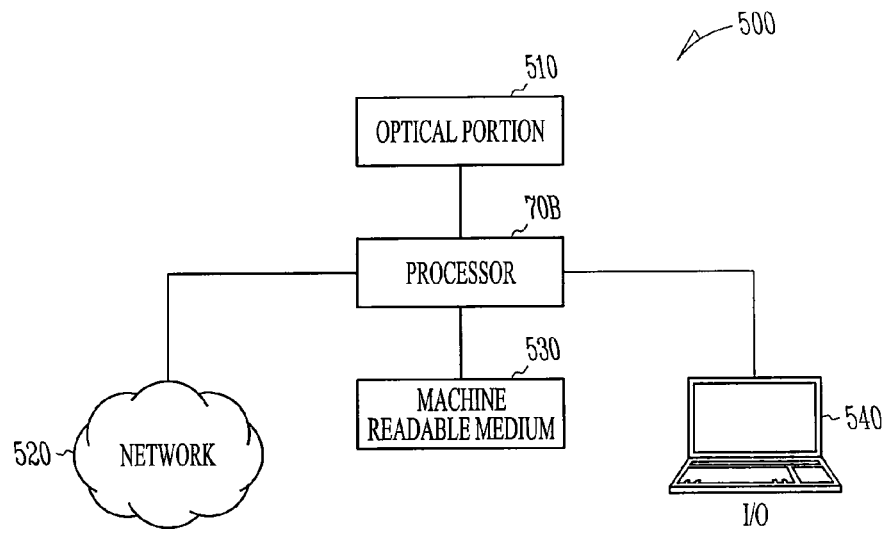
FIG. 5 illustrates a block diagram of a system according to an example embodiment.

FIG. 5 illustrates a block diagram of system 500 according to one example. System 500 includes processor 70B coupled to optical portion 510. Optical portion 510 can include, in various combinations, a plurality of cameras (or one camera and a plurality of mirrors), light, a registration marking light source, and a convergent beam light source. Processor 70B is also coupled to network 520. Network 520 can include a digital communication network or an analog communication network such as a wide area or local area network. Network 520 can include wired and wireless components, and in one example, includes the Internet. Processor 70B is configured to communicate with machine-readable medium 530. In various examples, machine-readable medium 530 can include a memory device, a signal communicated using a network, or other storage for executing a programmed method. Processor 70B is coupled to I/O 540. I/O 540 can include a personal computer, a printer, a display, a keyboard, or other device for rendering (output) or entering (input) data or instructions.

An illumination source, such as source 410A and source 410B, can be controlled by processor 70B or by I/O 540.

Figure 6:
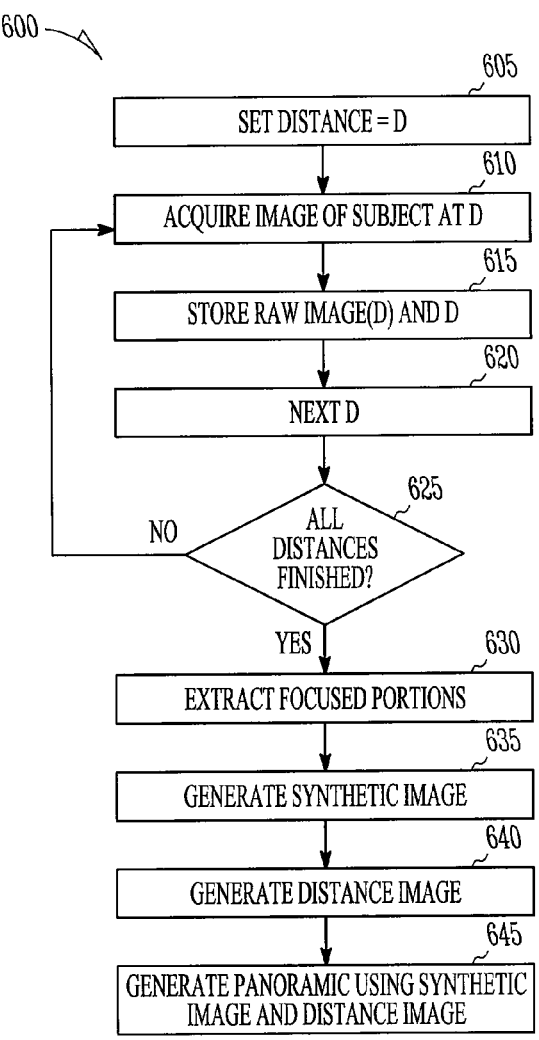
FIG. 6. illustrates a flow chart for a method according to an example embodiment.

FIG. 6. illustrates a flow chart for method 600 according to one example. At 605, method 600 includes setting a value of distance variable to value D. At 610, method 600 includes acquiring an image of the subject at a distance equal to value D. At 615, the raw image (at a distance equal to value D) and value D is stored in a memory. The raw image and the value can be stored in a memory accessible to processor 70B.

At 620, value D is shifted to the next value. Value D can be configured to be incremented or decremented. At 625, a query is presented to determine if data (including images and distance values) for all distances have been acquired. If answered in the negative, then method 600 continues by returning to acquire an image at 610. If the results of the query at 625 are in the affirmative, then method 600 continues, at 630, with extracting focused portions from the raw images. At 635, the synthetic image is generated by fusing the focused portions. At 640, the distance image is generated using the distance information. At 645, a panoramic image is generated using the synthetic image and the distance image for a particular radial.

In one example, the panoramic image format has an image point density of either 500 or 1000 pixels per inch (ppi). One standard for roll-finger images provides that the image cover at least 80% of the finger arc, connecting the opposite nail edges. Since the sensor arrays of cameras 60A, 60B, and 60C are planar, one approach for obtaining a panoramic image includes stitching together planar images taken from two or more (for example, three or five) different angles. In one example, image fusion is used to generate a reasonable depth of focus. Also, for reasons of geometric accuracy, the raw images may be corrected for magnification and projection errors.

One example of the present system has a resolution of 500 ppi. This resolution translates to a pixel density in the object plane of about 20 pix/mm (the pixel pitch in the plane is 0.05 mm). An image exposure time of 1 ms permits the system to operate at a relative velocity up to 100 nm/s. The exposure time can be reduced by increasing illumination or by adjusting the optic system f-number.

Consider an example in which the finger is moving approximately toward the cameras (or vice versa). Precise direction and velocity of the finger in the volume is irrelevant and may differ in various scanning events.

For this example, consider that volume 55 (FIG. 1) is 30 mm deep and the depth of focus is 2 mm. The sharp areas in successive images are configured to overlap in order to enable fusion. In one example, the overlap is approximately 25% and each slice will add $(1-0.25) \times 2 = 1.5$ mm of new coverage. To cover the whole volume, the camera acquires $30/1.5=20$ frames. Of those 20 frames, some will be largely blurred and can be discarded before fusing.

Moving at a velocity of 100 mm/s, the finger travels 1.5 mm in 15 ms, so shooting the whole sequence will take $20 \times 15 = 300$ ms. As such, the cameras operate at 66.6 frames per second. Other cameras having different performance can be used, which may allow extending both the maximum velocity and the size of volume 55.

Lowering the relative velocity while retaining the high frame rate will result in larger slice overlaps and hence a larger number of images due to increased redundancy. The relative motion can be produced by sweeping the finger through volume 55 or by moving the camera assembly toward a more or less stationary finger.

The panoramic image can include a projection from the center onto the inner surface of an inner cylinder. The inner cylinder axis is approximately aligned with the finger axis. According to one example, an illuminator is approximately coaxial with the camera axis in order to obtain finger pattern images having good contrast and low geometric distortion caused by shadows cast by the finger pattern ridges.

The illuminator can be coaxial with the camera. A panoramic image can be expressed in cylindrical coordinates. As such, a pixel of the panoramic image represents the intensity of the light reflected from the subject and records the subject depth (distance to the subject from the perimeter).

According to one example, the panoramic image is generated from three synthetic images and three distance images. A distance image represents the depth (or distance) associated with the various focused portions in the sequence of raw images. One example recovers the depth information and thus the finger bulb shape.

One example includes a method for standoff (or touchless) capture of a fingerprint image that is free of pressure-induced distortion caused by the typical ink pad and paper method.

Additional processing using the panoramic image, the synthetic images, or distance images can generate any of a number of selected projections of the data.

In one example, visible spectrum light is used to acquire images within a range of distances. In the context of fingerprint capture, a working distance can be between approximately a few and a few tens of centimeters from the subject to the optical elements.

In one example, a registration mark is used to facilitate fusing or stitching of the various images. A registration mark can be a pixel-size spot that is projected onto the surface of the subject. A projector can, for example, illuminate a small region without adversely affecting the resulting image quality. At 15 pixels/mm, a marker spot can be a couple of pixels wide or approximately 0.1 mm in diameter. In one example, the projector is integrated with the camera and controlled by processor 70B.

One example includes a system having a plurality of cameras and a processor. The plurality of cameras are configured to generate a plurality of raw images of a subject in a volume. The cameras have a fixed focal length and a fixed depth of focus that is substantially less than a thickness of the subject. The cameras are directed along selected radials with respect to a volume. A distance between a camera and the subject is variable. A raw image includes a focused portion of the subject corresponding to the distance. The focused portion is determined by the focal length and determined by the depth of focus.

The processor is coupled to the plurality of cameras. The processor is configured to execute a set of instructions to generate a panoramic image. The panoramic image is based on a plurality of synthetic images and based on a plurality of distance images. For a particular radial, a particular synthetic image includes a fusion of a plurality of focused portions. Also for that particular radial, a distance image is based on the distance between the camera and the subject.

In one example, at least one camera remains stationary and the subject is mobile and in another example, at least one camera is mobile and the subject is stationary. Optionally, at least one camera is configured to generate a time series of raw images. In one example, the processor is configured to generate a particular synthetic image using the raw images and a measure of contrast. In one example, the processor is configured to communicate using a digital network.

One example includes a method. For at least two radials from a volume, the method includes receiving a sequence of acquired images differentiated in a distance from a camera to a subject within the volume. The camera has a fixed focal length and a fixed depth of focus that is substantially less than a thickness of the subject. An acquired image has a focused portion of the subject based on the distance. The focused portion is determined by the focal length and determined by the depth of focus. For a particular sequence of acquired images, the method includes generating a synthetic image using the focused portions and includes generating a distance image using the distances. The method includes generating a panoramic image using at least two synthetic images and at least two distance images.

In one example, the method includes moving the subject relative to a fixed location of the camera, and in one example, the method includes moving the camera relative to a fixed location of the subject. Optionally, the method includes extracting a slice from an acquired image, and in one example, this includes calculating contrast. In one example, generating the distance image includes measuring a parameter using convergent light beams. In one example, the method includes forming a two-dimensional representation of the subject.

One example includes a machine-readable medium having machine-executable instructions for performing a method. The method includes acquiring a plurality of raw images for a subject in a volume. The raw images are spatially differentiated as to a distance between the subject and a camera. The raw images have a focused portion of the subject. The raw images correspond to at least two radials about the volume. The camera has a fixed focal length and a fixed depth of focus that is substantially less than a thickness of the subject. The focused portion is determined by the focal length and determined by the depth of focus. The method includes generating a synthetic image for a particular radial. The synthetic image corresponds to a fusion of the focused portions of the raw images of the particular radial. The method includes generating a distance image for the particular radial. The distance image corresponds to the distance of the focused portions of the raw images of the particular radial. The method includes generating a panoramic image using the synthetic images and using the distance images.

In one example, the method includes controlling the distance between the subject and the camera. In one example, the method includes controlling a position of the camera. Optionally, the method includes measuring a parameter using two convergent light beams. Optionally, the method includes measuring an illuminated region on the subject using two convergent light beams. In one example, generating the synthetic image includes calculating a measure of contrast. In one example, the method includes controlling an illumination source.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described.

Method examples described herein can be machine-implemented or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art, upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
   a plurality of cameras to generate a plurality of raw images of a fingerprint in a volume, the cameras having a fixed focal length and a fixed depth of focus substantially less than a thickness of the fingerprint and the cameras directed along selected radials of the volume, wherein a distance between a camera and the fingerprint is variable, and wherein a particular raw image includes a focused portion of the fingerprint corresponding to the distance, the focused portion determined by the focal length and determined by the depth of focus; and
   a processor coupled to the cameras to execute a set of instructions to generate a panoramic image, the panoramic image based on a plurality of synthetic images and based on a plurality of distance images, and wherein a particular synthetic image includes a fusion of focused portions.

2. The system of claim 1 wherein at least one camera is stationary and the fingerprint is mobile.

3. The system of claim 1 wherein at least one camera is mobile and the fingerprint is stationary.

4. The system of claim 1 wherein at least one camera is configured to generate a time series of raw images.

5. The system of claim 1 wherein the processor is configured to generate a particular synthetic image using the raw images and a measure of contrast.

6. The system of claim 1 wherein the processor is coupled to a communication network.

7. A method comprising:
   for at least two radials from a volume, receiving a sequence of acquired images differentiated in a distance from a camera to a fingerprint within the volume, wherein the camera has a fixed focal length and a fixed depth of focus substantially less than a thickness of the fingerprint, wherein a particular acquired image includes a focused portion of the fingerprint based on the distance, the focused portion determined by the focal length and determined by the depth of focus;
   for a particular sequence of acquired images, generating a synthetic image using the focused portions and generating a distance image using the distances; and
   generating a panoramic image using at least two synthetic images and at least two distance images.

8. The method of claim 7 wherein receiving the sequence of acquired images differentiated in a distance from the camera to the fingerprint includes moving the fingerprint relative to a fixed location of the camera.

9. The method of claim 7 wherein receiving the sequence of acquired images differentiated in a distance from the camera to the fingerprint includes moving the camera relative to a fixed location of the fingerprint.

10. The method of claim 7 wherein generating the synthetic image includes extracting a slice from a particular acquired image.

11. The method of claim 10 wherein extracting the slice includes calculating contrast.

12. The method of claim 7 wherein generating the distance image includes measuring a parameter using convergent light beams.

13. The method of claim 7 wherein generating the panoramic image includes forming a two-dimensional representation of the fingerprint.

14. A machine-readable memory device having machine-executable instructions for performing a method comprising:
   acquiring a plurality of raw images for a fingerprint in a volume, the raw images spatially differentiated as to a distance between the fingerprint and a camera and the raw images having a focused portion of the fingerprint, the raw images corresponding to at least two radials about the volume and the camera having a fixed focal length and a fixed depth of focus substantially less than a thickness of the fingerprint, the focused portion determined by the focal length and determined by the depth of focus; generating a synthetic image for a particular radial, the synthetic image corresponding to a fusion of the focused portions of the raw images of the particular radial;
   generating a distance image for the particular radial, the distance image corresponding to the distance of the focused portions of the raw images of the particular radial; and generating a panoramic image using the synthetic images and using the distance images.

15. The machine-readable memory device of claim 14 wherein the method includes controlling the distance between the fingerprint and the camera.

16. The machine-readable memory device of claim 14 wherein the method includes controlling a position of the camera.

17. The machine-readable memory device of claim 14 wherein generating the distance image includes measuring a parameter using two convergent light beams.

18. The machine-readable memory device of claim 14 wherein generating the distance image includes measuring an illuminated region on the fingerprint using two convergent light beams.

19. The machine-readable memory device of claim 14 wherein generating the synthetic image includes calculating a measure of contrast.

20. The machine-readable memory device of claim 14 wherein acquiring the plurality of raw images includes controlling an illumination source.

* * * * *